United States Patent [19]
Mahood

[11] Patent Number: 5,500,458
[45] Date of Patent: Mar. 19, 1996

[54] PHOSPHITE COATED POLYMERIC PARTICLES

[75] Inventor: James A. Mahood, Morgantown, W. Va.

[73] Assignee: General Electric Company, Pittsfield, Mass.

[21] Appl. No.: 316,692

[22] Filed: Sep. 30, 1994

[51] Int. Cl.$^6$ ................................................ C08K 5/527
[52] U.S. Cl. ........................ 523/205; 523/210; 523/223; 524/117
[58] Field of Search .................................. 524/117, 151, 524/147; 523/205, 210, 223

[56] References Cited

U.S. PATENT DOCUMENTS

| | | |
|---|---|---|
| 3,415,906 | 12/1968 | Shepard et al. ............................ 524/117 |
| 3,988,293 | 10/1976 | Mills . |
| 4,318,845 | 3/1982 | Spivack et al. . |
| 4,452,928 | 6/1984 | Trischman et al. ....................... 523/210 |
| 4,708,979 | 11/1987 | Pedrazzetti et al. ..................... 523/223 |
| 4,957,954 | 9/1990 | Iizuka et al. . |
| 5,023,285 | 6/1991 | Horn . |
| 5,158,992 | 10/1992 | Caselli et al. ............................. 523/207 |

Primary Examiner—Veronica P. Hoke

[57] ABSTRACT

A process is provided for stabilizing thermoplastic particles with organic phosphite particles. The process involves applying a liquid, relatively low molecular weight, phosphite to the surface of thermoplastic particles. The particles exhibit hydrolysis compared to conventional phosphite shell/polymeric core structures. The particles may be molded into useful thermoplastic articles.

4 Claims, No Drawings

PHOSPHITE COATED POLYMERIC PARTICLES

BACKGROUND OF THE INVENTION

1. Field of the Invention

The present invention relates to stabilized polymeric compositions, and more particularly relates to polyolefin particles coated with a phosphite stabilizer.

2. Description of the Related Art

Coating of polyolefin beads with phosphorous stabilizer compounds is known, and such processes have general involved melting of a solid phosphonite (phosphorous compound) stabilizer and spray coating polyolefin beads. Polyolefin beads may be made by any of conventional processes such as the Spheripol and Spherdene processes. Typical bead formation processes involve formation of polymer about catalytic seed particles to grow uniform shaped polyolefin beads. The above mentioned prior coating processes have typically had one or more of the following disadvantages: (1) requiring a melting step above 120° C. to place the high melting temperature phosphorous compounds in suitable condition for spray coating onto the beads, and (2) having a low hydrocarbon solubility (typically high molecular weight) resulting in coated polyolefin beads which exhibit an apparent morphology of a distinct polyolefin core and a distinct phosphonite compound shell surrounding the core without penetration of the compound into the outer surface of the core. Such shell configuration can result in undesirable levels of hydrolysis of the phosphorous compound upon extended exposure of the particles to humidity. And simple compounding processes undesirably expose the polymer and phosphorous compound to degradation upon exposure to heat and shear in the presence of oxygen.

SUMMARY OF THE INVENTION

The present invention involves a phosphite coated thermoplastic particle, and a process for coating polyolefin particles. The phosphite has a melting temperature of below 120° C., and has a solubility saturation value at 25° C. of at least 500 ppm in the stabilized polymer.

DETAILED DESCRIPTION OF THE INVENTION

Various type of thermoplastics can be made via processes which yield small spherical beads, the most common of which is polyolefin. Examples of classes of thermoplastics that can be made in processes yielding beaded spherical particles include polymers of monoolefins and diolefin.

Polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example mixtures of polypropylene with (PP) polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, eEhylene/heptene, ethylene/octene, propylene/isobutylene, ethylene/butane-1, propylene/butadiene, isobutylene/isoprene, ethylene/alkyl acrylates, ethylene-alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopentadiene or ethylidenenorbornene; as well as mixtures of such copolymers and their mixtures with polymers mentioned above, for example polypropylene/ethylene-propylene-copolymers, LDPE/EVA, LDPE/EAA, LLDPE/EVA and LLDPE/EAA.

Thermoplastic polymers in bead or particulate form may also include styrenic polymers, such as polystyrene, poly-(p-methylstyrene), poly-(alphamethylstyrene), copolymers of styrene or alphamethylstyrene with dienes or acrylic derivatives, such as, for example, styrene/butadiene, styrene/acrylonitrile, styrene/alkyl methacrylate, styrene/maleic anhydride, styrene/butadiene/ethyl acrylate/styrene/acrylonitrile/methylacrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene. Styrenic polymers may additionally or alternatively include graft copolymers of styrene or alpha-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs such as methacrylonitrile, such as polyacrylonitrile, acrylonitrile/butadiene polymers, acrylonitrile/alkyl acrylate polymers, acrylonitrile/alkyl methacrylate/butadiene polymers, ABS, and ABS which includes methacrylonitrile.

Polymers based on acrylic acids, such as acrylic acid, methacrylic acid, methylmethacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

The phosphites suitable for the present invention are phosphites having melt temperatures of less than 120° C., preferably less than 50° C., and most preferably less than 25° C. The phosphites are preferably monophosphites or diphosphite and preferably have molecular weights less than 1000 grams/mol, and more preferably less than 800 grams per mol. The phosphites preferably has a solubility in the polymer sufficient for the phosphite to be contained therein at levels of at least 500 parts per million (ppm) based on the weight of the polymer, and more preferably at a level of between 750 ppm and 2000 ppm. It is not known what the exact phosphite distribution is across the particles, but it is envisioned the stabilized particles may be in the form of spherical beads having an inner core of polymer free or substantially free (less than 50 ppm) of phosphite and having an outer zone adjacent the surface comprising polymer and phosphite wherein the phosphite is present at a level of at least 100 parts per million, for example, at least 500 parts per million and for further example, from 750 to 2000 parts per million based on the total weight of the polymer in the zone; and the zone may have a thickness of at least 0.1 microns, for example, from 0.5 microns to 20 microns, and for further example, from 1 micron to 10 microns. The spherical particles preferably have outerdiameters of between 10 mils and 125 mils, more preferably between 20 mils and 100 mils, and most preferably between 40 mils and 80 mils.

The process involves (a) applying a phosphite in liquid form (by melting or otherwise) to the surface of a polymeric particle, wherein the phosphite has a melting temperature of less than 120° C. and a solubility in the polymer of at least 500 ppm, to produce a stabilized polymeric particle. It is envisioned that the particle may have an inner core which is substantially free of phosphite (less than 10 ppm) and have an outerzone adjacent the surface of the particle wherein the zone may have a phosphite loading of at least 100 ppm resulting from absorption of the phosphite from the outer surface of the particle into the particle to form the zone. The liquid phosphite may be applied by spraying or other suitable means to effectively contact the surface of the particle with the phosphite. Due to the high solubility of the phosphite in the polymer, the phosphite quickly (rapidly) solubilizes into the polymeric particle.

It is envisioned that by creating the zone containing both polymer and phosphite, the zone can effectively resist hydrolysis of the phosphite better than a mere surface shell consisting of phosphite surrounding core consisting of polymer. In other words, the present coated bead structures have a clear advantage of enhanced hydrolysis resistance over simple shell/core structures. The present process and structure surprisingly and unexpectedly enhances the hydrolytic stability of the phosphite of the particles.

|  | Examples | |
| --- | --- | --- |
| Time (weeks) | Example A | Example B |
| 0 | 92 | 100 |
| 1 | 22 | 56 |
| 2 | 26 | 41 |
| 3 | 5 | 36 |
| 4 | 0 | 39 |

Example A involved coating polypropylene spherical beads with a high molecular weight commercial diphosphonite that formed a conventional shell/core structure. Example B involved applying liquid tris(nonylphenyl) phosphites to polypropylene spherical beads to form a polypropylene/phosphite zone. The above examples set out the percentage unhydrolyzed phosphite upon exposure of the treated beads to 60° C./75% nominal relative humidity for periods of 0, 1, 2, 3 and 4 weeks. Note the greatly enhanced resistance to hydrolysis exhibited by the beads made by the present process. Use of low melting temperature phosphite allows for low temperature (less than 40° C. or less than 30° C.) application process thereby avoiding undesirable exposure of Ehe polymer to high heats. High solubility of the phosphites in the polymer is preferred to enhance the ability to form the desired zone. The most preferred phosphites are trisnonylphenyl phosphite, high ortho trisnonylphenyl phosphite, and phosphites of the formulas:

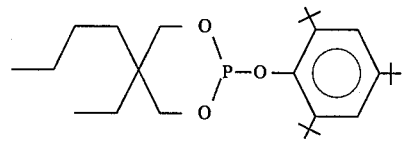

and

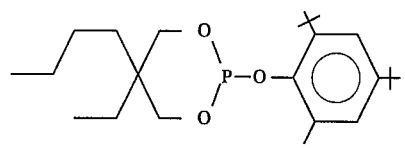

The beads are preferably substantially spherical in shape.

What is claimed is:

1. A process for producing stabilized polymeric polyolefin particles comprising applying a liquid phosphite to a the outer surface of a polymeric bead to absorb said phosphite into an outer zone of said bead, said phosphite having a melting temperature of less than 120° C., said phosphite having a solubility, saturation value at 25° C. of at least 500 ppm in the stabilized polymer wherein an outer zone of said particle adjacent the outer surface has a phosphite loading of at least 100 ppm and an inner zone substantially free of said phosphite and said phosphite has a formula selected from the following formula:

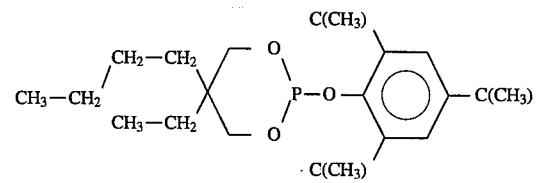

and

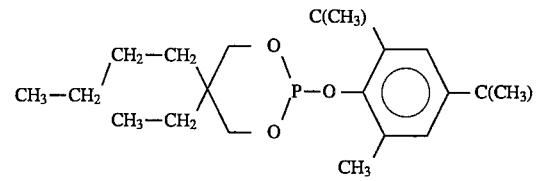

2. The process of claim 1 wherein said particles are polypropylene spherical beads.

3. The process of claim 1 wherein said application is done at a liquid phosphite temperature of less than 50° C.

4. The process of claim 1 wherein said application is done at a liquid phosphite temperature of less than 25° C.

* * * * *